United States Patent
Abe

(10) Patent No.: US 9,594,235 B2
(45) Date of Patent: Mar. 14, 2017

(54) ZOOM LENS SYSTEM

(71) Applicant: HANWHA TECHWIN CO.,LTD., Changwon-Si (KR)

(72) Inventor: Yasuhiko Abe, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 0 days.

(21) Appl. No.: 14/562,823

(22) Filed: Dec. 8, 2014

(65) Prior Publication Data

US 2015/0370052 A1   Dec. 24, 2015

(30) Foreign Application Priority Data

Jun. 20, 2014 (KR) ........................ 10-2014-0075891

(51) Int. Cl.
| | | |
|---|---|---|
| *G02B 15/173* | (2006.01) | |
| *G02B 15/14* | (2006.01) | |
| *G02B 15/15* | (2006.01) | |
| *G02B 27/00* | (2006.01) | |

(52) U.S. Cl.
CPC .......... *G02B 15/173* (2013.01); *G02B 15/14* (2013.01); *G02B 15/15* (2013.01); *G02B 27/0062* (2013.01)

(58) Field of Classification Search
CPC .... G02B 15/24; G02B 15/28; G02B 27/0062; G02B 15/14; G02B 15/15; G02B 15/163; G02B 15/167; G02B 15/173
USPC ................................ 359/676, 677, 683, 685
See application file for complete search history.

(56) References Cited

U.S. PATENT DOCUMENTS

| | | | |
|---|---|---|---|
| 5,537,255 A | 7/1996 | Tochigi | |
| 7,256,946 B2 | 8/2007 | Yoneyama | |
| 7,286,304 B1 * | 10/2007 | Ohtake ................. | G02B 15/173 359/686 |
| 7,813,051 B2 | 10/2010 | Saori | |
| 2007/0139794 A1 * | 6/2007 | Misaka .................. | G02B 13/02 359/781 |
| 2011/0102906 A1 * | 5/2011 | Oe ........................ | G02B 15/173 359/684 |
| 2011/0134266 A1 * | 6/2011 | Mihara .................. | G02B 13/18 348/222.1 |
| 2014/0049673 A1 | 2/2014 | Nakamura | |
| 2014/0204470 A1 * | 7/2014 | Chen ..................... | G02B 15/173 359/687 |
| 2015/0002943 A1 * | 1/2015 | Ono ........................ | G02B 9/34 359/684 |

(Continued)

FOREIGN PATENT DOCUMENTS

| | | |
|---|---|---|
| JP | 3109342 B2 | 11/2000 |
| JP | 2010-39426 A | 2/2010 |

(Continued)

*Primary Examiner* — Jordan Schwartz
(74) *Attorney, Agent, or Firm* — Sughrue Mion, PLLC

(57) ABSTRACT

Provided is a zoom lens system, sequentially arranged in an order from an object side to an image side, including: a first lens group having a positive refractive power; a second lens group having a negative refractive power; an aperture stop; a third lens group having a positive refractive power; a fourth lens group having a positive refractive power; and a fifth lens group having a positive refractive power, wherein each of the second lens group, the third lens group, and the fourth lens group has an anomalous dispersion ΔPct of −0.1 or less.

9 Claims, 5 Drawing Sheets

(56) References Cited

U.S. PATENT DOCUMENTS

2015/0065330 A1* 3/2015 Koide ................... C03C 3/064
501/79

FOREIGN PATENT DOCUMENTS

| | | |
|---|---|---|
| JP | 2010-152083 A | 7/2010 |
| JP | 2014-38238 A | 2/2014 |
| KR | 10-2007-0040929 A | 4/2007 |

* cited by examiner

ZOOM LENS SYSTEM

CROSS-REFERENCE TO RELATED APPLICATION

This application claims priority from Korean Patent Application No. 10-2014-0075891, filed on Jun. 20, 2014, in the Korean Intellectual Property Office, the disclosure of which is incorporated herein by reference in its entirety.

BACKGROUND

1. Field

Apparatuses consistent with exemplary embodiments relate to a zoom lens system, and more particularly, to a zoom lens system which effectively corrects an aberration.

2. Description of the Related Art

Photographing devices that generate images using charge coupled devices (CCDs) or complementary metal-oxide semiconductors (CMOSs) have been manufactured to have a markedly increased number of pixels per unit area due to digital advances. Digital photographing devices with an increased number of pixels per unit area require lens systems having high optical performance while there is a trend toward having more compact photographing devices for convenience.

Lens systems are required to effectively correct an aberration even in a peripheral region of a screen so as to provide clear information even with small details of a subject. However, it is difficult to reduce the size of lens systems having high performance, and size reduction may result in increasing the manufacturing costs. Therefore, there is a need for small lens systems that have high performance and low manufacturing costs.

SUMMARY

If zoom lens systems of the related art are configured to effectively correct an aberration, the sizes of the zoom lens systems increase.

One or more exemplary embodiments provide a zoom lens system capable of effectively correcting an aberration while overcoming the limitations of the related art. However, the exemplary embodiments are not limited thereto.

Additional aspects will be set forth in part in the description which follows and, in part, will be apparent from the description, or may be learned by practice of the exemplary embodiments.

According to an aspect of an exemplary embodiment, there is provided a zoom lens system including a positive first lens group, a negative second lens group, an aperture stop, a positive third lens group, a positive fourth lens group, and a positive fifth lens group that are sequentially arranged from an object side to an image side, wherein each of the second lens group, the third lens group, and the fourth lens group has an anomalous dispersion ΔPct of −0.1 or less.

The zoom lens system may be configured to vary a magnification setting between a wide angle position and a telephoto position by changing a distance between the first lens group and the second lens group.

The zoom lens system may be configured to vary the magnification setting of the zoom lens system is varied from a wide angle position to a telephoto position by increasing a distance between the first lens group and the second lens group.

Positions of the first lens group and the fifth lens group are fixed along an optical axis.

In response to a magnification setting of the zoom lens system being varied from a wide angle position to a telephoto position, a distance between the aperture stop and the third lens group may be configured to be decreased and fixed at a preset value after being decreased.

At least one of the second lens group, the third lens group, and the fourth lens group includes a lens having an aspheric surface.

Each of the second lens group, the third lens group, and the fourth lens group includes a lens having an aspheric surface.

There is provided an image capturing system including: an imaging device configured to capture an image; and the zoom lens system described above.

Other aspects will be clearly understood from the following detailed description, claims, and accompanying drawings.

BRIEF DESCRIPTION OF THE DRAWINGS

The above and/or other aspects of the disclosure will become apparent and more readily appreciated from the following description of exemplary embodiments, taken in conjunction with the accompanying drawings in which.

DETAILED DESCRIPTION

Figure 1:
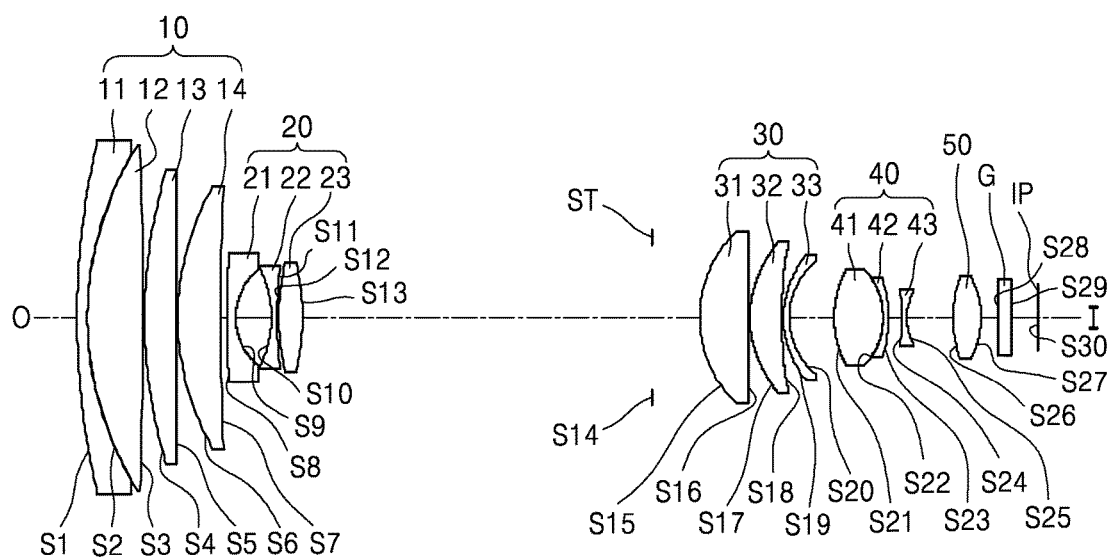
FIG. 1 is a schematic view illustrating a zoom lens system at a wide-angle position according to an exemplary embodiment.

Reference will now be made in detail to exemplary embodiments, examples of which are illustrated in the accompanying drawings. Effects and features of the exemplary embodiments, and implementation methods thereof will be clarified through the following descriptions given with reference to the accompanying drawings. In this regard, the exemplary embodiments may have different forms and should not be construed as being limited to the descriptions set forth herein. As used herein, the term "and/or" includes any and all combinations of one or more of the associated listed items. Expressions such as "at least one of," when preceding a list of elements, modify the entire list of elements and do not modify the individual elements of the list.

Hereinafter, the exemplary embodiments will be described in detail with reference to the accompanying drawings. In the drawings, like reference numerals denote like elements, and overlapping descriptions thereof will be omitted.

In the drawings, the sizes of elements may be exaggerated for clarity. For example, in the drawings, the size or thickness of each element may be arbitrarily shown for illustrative purposes, and thus the present invention should not be construed as being limited thereto.

Figure 2:
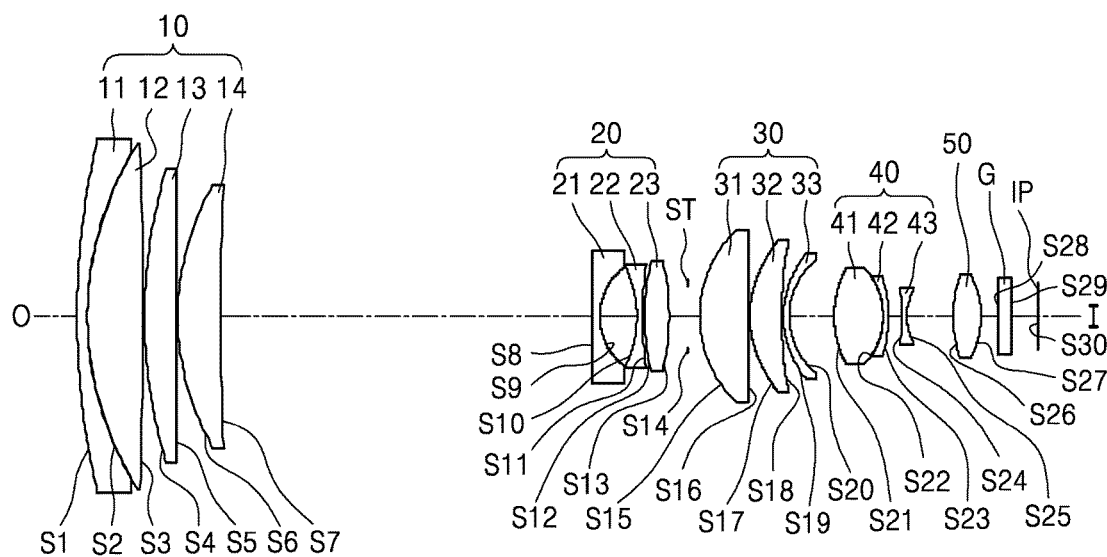
FIG. 2 is a schematic view illustrating the zoom lens system at a telephoto position according to an exemplary embodiment.

FIGS. 1 and 2 are schematic views illustrating a zoom lens system according to an exemplary embodiment. FIG. 1 illustrates a wide angle position of the zoom lens system of the exemplary embodiment, and FIG. 2 illustrates a telephoto position of the zoom lens system of the exemplary embodiment.

The zoom lens system of the exemplary embodiment includes a first lens group 10, a second lens group 20, an aperture stop ST, a third lens group 30, a fourth lens group 40, and a fifth lens group 50 that are sequentially arranged in a direction from an object side O to an image side I. An optical block G, such as an optical filter or a face plate, may be disposed between the fifth lens group 50 and an image surface IP. The first lens group 10 may have a positive refractive power, the second lens group 20 may have a negative refractive power, and the third to fifth lens groups 30 to 50 may each have positive refractive powers.

As shown in FIGS. 1 and 2, the first lens group 10 may include first, second, third and fourth lenses 11, 12, 13, 14; the second lens group 20 may include first, second, and third lenses 21, 22, 23; the third lens group 30 may include first, second and third lenses 31, 32, 33; the fourth lens group 40 may include first, second, and third lenses 41, 42, 43; and the fifth lens group 50 may include a lens 50. In this case, the first lens 11 and the second lens 12 of the first lens group 10 may be provided in the form of a doublet lens, and the first lens 41 and the second lens 42 of the fourth lens group 40 may be provided in the form of a doublet lens. Here, a double lens may mean a cemented lens.

In the exemplary embodiment, as shown in FIGS. 1 and 2, the magnification of the zoom lens system may be varied by adjusting a distance between the first lens group 10 and the second lens group 20, that is, by moving the second lens group 20 along an optical axis O. In detail, the magnification setting of the zoom lens system may be varied from a wide angle position to a telephoto position by increasing the distance between the first lens group 10 and the second lens group 20. When the magnification setting of the zoom lens system is varied from the wide-angle position to the telephoto position, the distance between the aperture stop ST and the third lens group 30 may be decreased and then may be fixed at a preset value.

In this case, each of the second, third and fourth lens groups 20, 30, 40 may have an anomalous dispersion ΔPct of −0.1 or less. Then, an axial chromatic aberration may be easily corrected at the telephoto position. Otherwise, it may be difficult to correct the axial chromatic aberration at the telephoto position, and thus, although visible rays are focused, near-infrared rays having a wavelength of about 850 nm may not be focused. On the other hand, if the near-infrared rays are focused, the visible rays may not be focused.

In the exemplary embodiment, however, since the zoom lens system satisfies the above-mentioned condition, a chromatic aberration may be effectively corrected in a region from visible rays to near-infrared rays. Therefore, if the zoom lens system of the exemplary embodiment is applied to an image capturing system that captures images using an imaging device and visible rays in the daytime and using the image device and near-infrared rays at night, errors such as focusing errors may be suppressed during dawn and twilight hours, and thus high-quality images may be obtained regardless of the photographing time. Particularly, if a place illuminated by a streetlight emitting visible rays and a place to which near-infrared rays are casted are both within a photographing range at night, clear images may be obtained through both visible rays and near-infrared rays by using the zoom lens system of the exemplary embodiment.

In the zoom lens system of the embodiment, the positions of the first lens group 10 and the fifth lens group 50 may be fixed along the optical axis O. In the zoom lens system of the exemplary embodiment, the first lens group 10 is the last lens group in a direction toward the object side O (i.e. the first lens group 10 is the closest to the object side), and the fifth lens group 50 is the last lens group in a direction toward the image side I (i.e. the fifth lens group 50 is the closest to the image side). Therefore, if the positions of the first lens group 10 and the fifth lens group 50 are fixed, the inside of the zoom lens system may be effectively protected from foreign substances such as dust particles from entering therein during, for example, zooming or focusing.

As described above, when the magnification setting of the zoom lens system is varied from the wide angle position to the telephoto position, the distance between the aperture stop ST and the third lens group 30 may be decreased. In this case, the first lens group 10 may have a small outer diameter, and the zoom lens system may have a small overall length. That is, the size of the zoom lens system may be reduced. In the zoom lens system, the weight proportion of the first lens group 10 is greater than the weight proportions of the other lens groups, and the first lens group 10 is relatively expensive compared to the other lens groups. If the third lens group 30 is spaced apart from the aperture stop ST at the wide angle position, the outer diameter of the first lens group 10 may be reduced to decrease the total size and manufacturing costs of the zoom lens system. During zooming from the wide angle position to the telephoto position, if the third lens group 30 as well as the second lens group 20 is moved, the zoom lens system may have a high magnification even though the total length of the zoom lens system is not great.

In addition, since the influence of the third lens group 30 on zooming is reduced as it moves to the wide angle position, when zooming from the wide angle position to the telephoto position, the distance between the aperture stop ST and the third lens group 30 may be decreased and then be fixed at a preset value. As the third lens group 30 moves toward the telephoto position, it may be required to control the positions of lenses more precisely. Therefore, if the distance between the aperture stop ST and the third lens group 30 reaches a preset value around the wide angle position, the distance between the aperture stop ST and the third lens group 30 may be fixed for efficient position settings of lenses.

One or more of the second, third and fourth lens groups 20, 30, 40 may include a lens having an aspheric surface. In this case, various aberrations may be effectively corrected. If a lens having an aspheric surface is included in the second lens group 20, a peripheral aberration may be effectively corrected mainly at the wide angle position. If a lens having an aspheric surface is included in the third lens group 30, a spherical aberration may be effectively corrected mainly in each zoom band, particularly, at the wide angle position. If a lens having an aspheric surface is included in the fourth lens group 40, aberration variations caused by a focusing distance may be mainly suppressed.

Therefore, as described above, the zoom lens system of the exemplary embodiment may be small and capable of effectively correcting an aberration even in peripheral regions while allowing for high-magnification zooming. In addition, a chromatic aberration may be effectively corrected in a region from visible rays to near-infrared rays. Therefore, if the zoom lens system of the exemplary embodiment is applied to a system that captures images using an imaging device and visible rays in the daytime and the image device and near-infrared rays at night, errors such as focusing errors may be suppressed during the dawn and twilight hours, and thus high-quality images may be obtained regardless of the photographing time. Particularly, if a place illuminated by a streetlight emitting visible rays and a place to which near-infrared rays are casted are both within a photographing range at night, clear images may be obtained through both visible rays and near-infrared rays by using the zoom lens system of the exemplary embodiment.

In the exemplary embodiments, when an optical axis is denoted by an x-axis, a direction perpendicular to the optical axis is denoted by an y-axis, and the propagation direction of light rays is positive, aspheric surfaces may be defined by the following formula:

$$x = \frac{cy^2}{1 + \sqrt{1 - (1+K)c^2 y^2}} + Ay^4 + By^6 + Cy^8 + Dy^{10}$$

where x denotes a distance measured from the vertex of a lens in the direction of the optical axis of the lens, y denotes a distance measured from the optical axis in a direction perpendicular to the optical axis, K denotes a conic constant, A, B, C, and D denote aspheric coefficients, and c denotes the reciprocal (1/R) of the radius of curvature at the vertex of the lens.

Tables 1 through 3 below show design data for the zoom lens system illustrated in FIGS. 1 and 2. In the design data, S denotes surface numbers, r denotes radii of curvature in millimeters (mm), d denotes lens center thicknesses or distances between lenses in millimeters (mm), nd denotes refractive powers, and vd denotes Abbe numbers.

TABLE 1

| S | r | d | nd | vd |
|---|---|---|---|---|
| 1 | 80.106 | 1.00 | 1.83481 | 42.72 |
| 2 | 32.884 | 5.40 | 1.43700 | 95.10 |
| 3 | −500.000 | 0.15 | | |
| 4 | 52.846 | 4.16 | 1.43700 | 95.10 |
| 5 | INFINITY | 0.15 | | |
| 6 | 26.815 | 4.16 | 1.43700 | 95.10 |
| 7 | 278.559 | variable 1 | | |
| 8 | 500.000(aspheric) | 0.80 | 1.88202 | 37.22 |

TABLE 1-continued

| S | r | d | nd | vd |
|---|---|---|---|---|
| 9 | 6.201(aspheric) | 3.49 | | |
| 10 | −11.214 | 0.55 | 1.91082 | 35.25 |
| 11 | 50.933 | 0.15 | | |
| 12 | 23.669 | 2.34 | 1.94595 | 17.98 |
| 13 | −23.669 | variable 2 | | |
| 14 | INFINITY | variable 3 | | |
| 15 | 12.127 | 4.72 | 1.43700 | 95.10 |
| 16 | INFINITY | 0.15 | | |
| 17 | 10.827(aspheric) | 3.081 | 1.49710 | 81.56 |
| 18 | 69.665(aspheric) | 0.15 | | |
| 19 | 9.991 | 0.55 | 1.80518 | 25.46 |
| 20 | 7.304 | variable 4 | | |
| 21 | 10.869(aspheric) | 4.70 | 1.49710 | 81.56 |
| 22 | −7.354 | 0.55 | 1.91082 | 35.25 |
| 23 | −13.398 | variable 5 | | |
| 24 | −92.564 | 0.55 | 1.80420 | 46.50 |
| 25 | 5.378 | 4.45 | | |
| 26 | 12.771 | 2.73 | 1.51742 | 52.15 |
| 27 | −8.952 | 1.56 | | |
| 28 | INFINITY | 1.30 | 1.51680 | 64.20 |
| 29 | INFINITY | 2.60 | | |
| 30 | INFINITY | 0.00 | | |

In Table 1 above, S14 is a surface number of the aperture stop ST, S28 and S29 are surface numbers of two surfaces of the optical block G, and S30 is a surface number of the image surface IP. As shown in Table 1 above, S8, S9, S17, S18, and S21 are aspheric surfaces.

Variables 1 through 5 included in distance (d) of Table 1 are variable distances between lenses, and specific values thereof are shown in Table 2 below with respect to focal lengths and aperture values when the distance between the zoom lens system and an object is infinite. In Table 2, data are given in millimeters (mm) except for the aperture values, and values in the "variable aperture stop" row are radius values.

TABLE 2

| Focal lengths | 4.53 | 10.01 | 64.82 | 135.39 |
|---|---|---|---|---|
| Aperture values | 1.68 | 3.11 | 4.54 | 4.99 |
| Variable 1 | 0.660 | 11.415 | 29.460 | 32.955 |
| Variable 2 | 33.792 | 23.037 | 4.992 | 1.497 |
| Variable 3 | 4.585 | 1.000 | 1.000 | 1.000 |
| Variable 4 | 4.434 | 6.917 | 3.608 | 8.243 |
| Variable 5 | 1.208 | 2.311 | 5.619 | 0.984 |
| Variable aperture stop | 7.30 | 4.65 | 3.15 | 2.95 |

In this case, the second lens group 20, the third lens group 30, and the second terminal 40 had an anomalous dispersion ΔPct of −0.1475.

Table 3 below shows aspheric coefficients of the zoom lens system illustrated in FIGS. 1 and 2. In Table 3, E-m (where m is a natural number) refers to $\times 10^{-m}$.

TABLE 3

| S | K | A | B | C | D |
|---|---|---|---|---|---|
| 8 | 0 | 8.666744E−05 | 1.893946E−07 | −4.499774E−08 | 3.551199E−10 |
| 9 | −0.0302098 | 9.482509E−06 | −8.073306E−07 | 4.875395E−07 | −1.920177E−08 |
| 17 | −0.0656973 | −6.969207E−05 | −2.679306E−07 | −2.807476E−09 | −7.187242E−11 |
| 18 | 0 | 6.097184E−05 | 4.296367E−07 | 0 | 0 |
| 21 | −0.1766709 | 5.749103E−06 | 1.316685E−06 | 5.212678E−08 | 3.353991E−09 |

Figure 3:
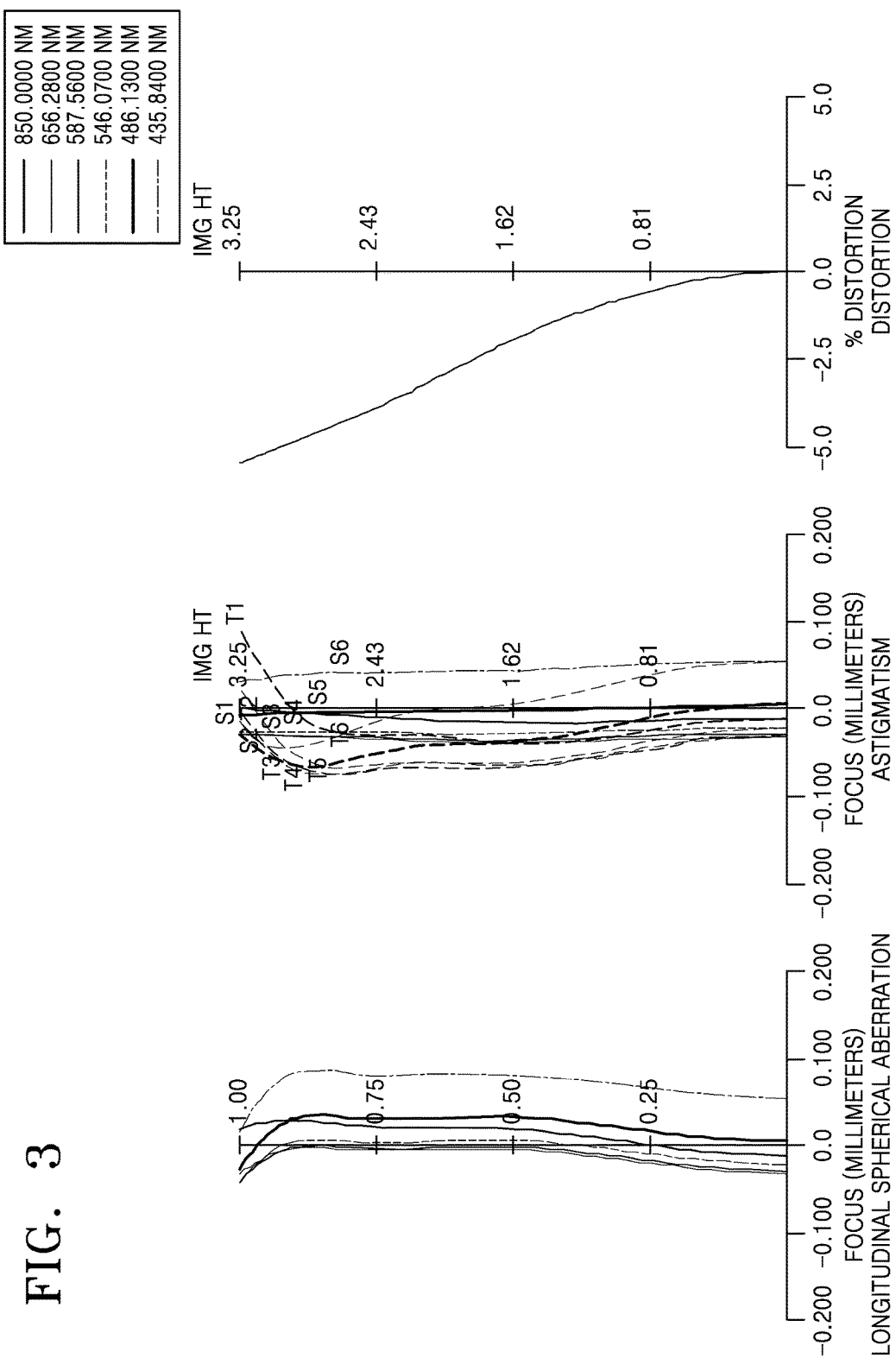
FIG. 3 illustrates graphs providing information about a longitudinal spherical aberration, astigmatism, and distortion of the zoom lens system at the wide-angle position illustrated in FIG. 1 according to an exemplary embodiment.
Figure 4:
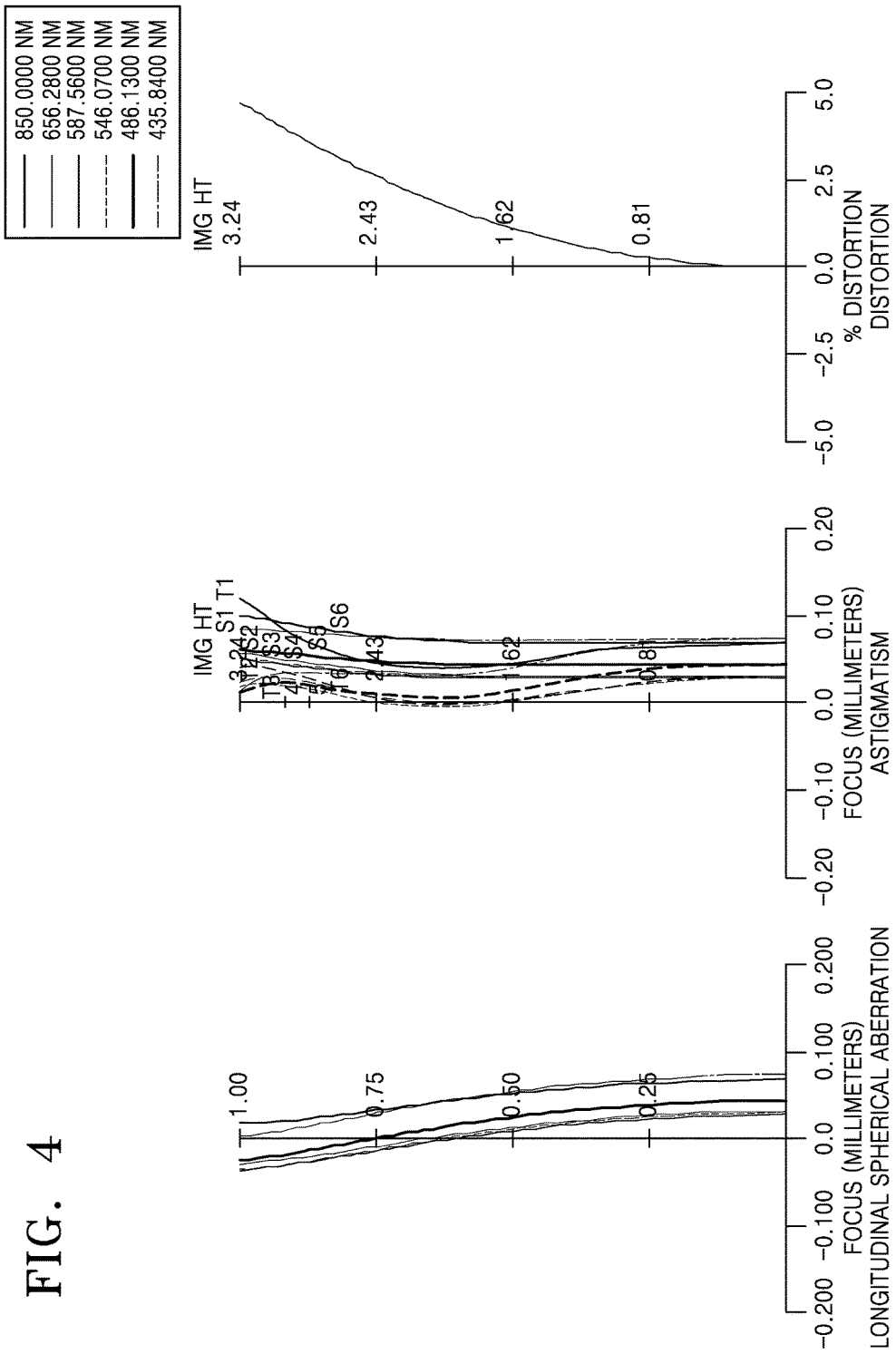
FIG. 4 illustrates graphs providing information about a longitudinal spherical aberration, astigmatism, and distortion of the zoom lens system at a first middle position between the wide angle position and the telephoto position according to an exemplary embodiment.
Figure 5:
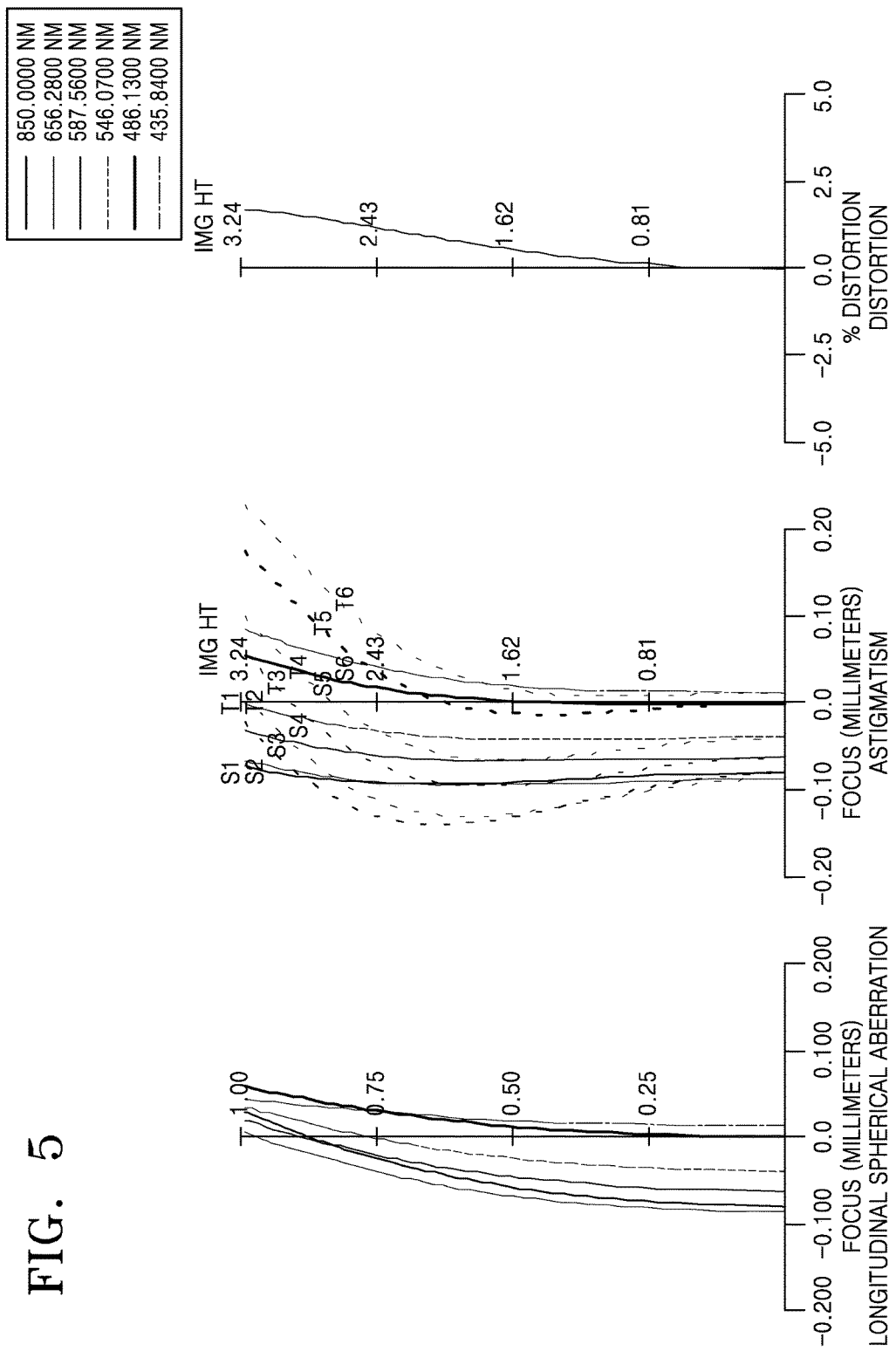
FIG. 5 illustrates graphs providing information about a longitudinal spherical aberration, astigmatism, and distortion of the zoom lens system at a second middle position between the wide-angle position and the telephoto position according to an exemplary embodiment.
Figure 6:
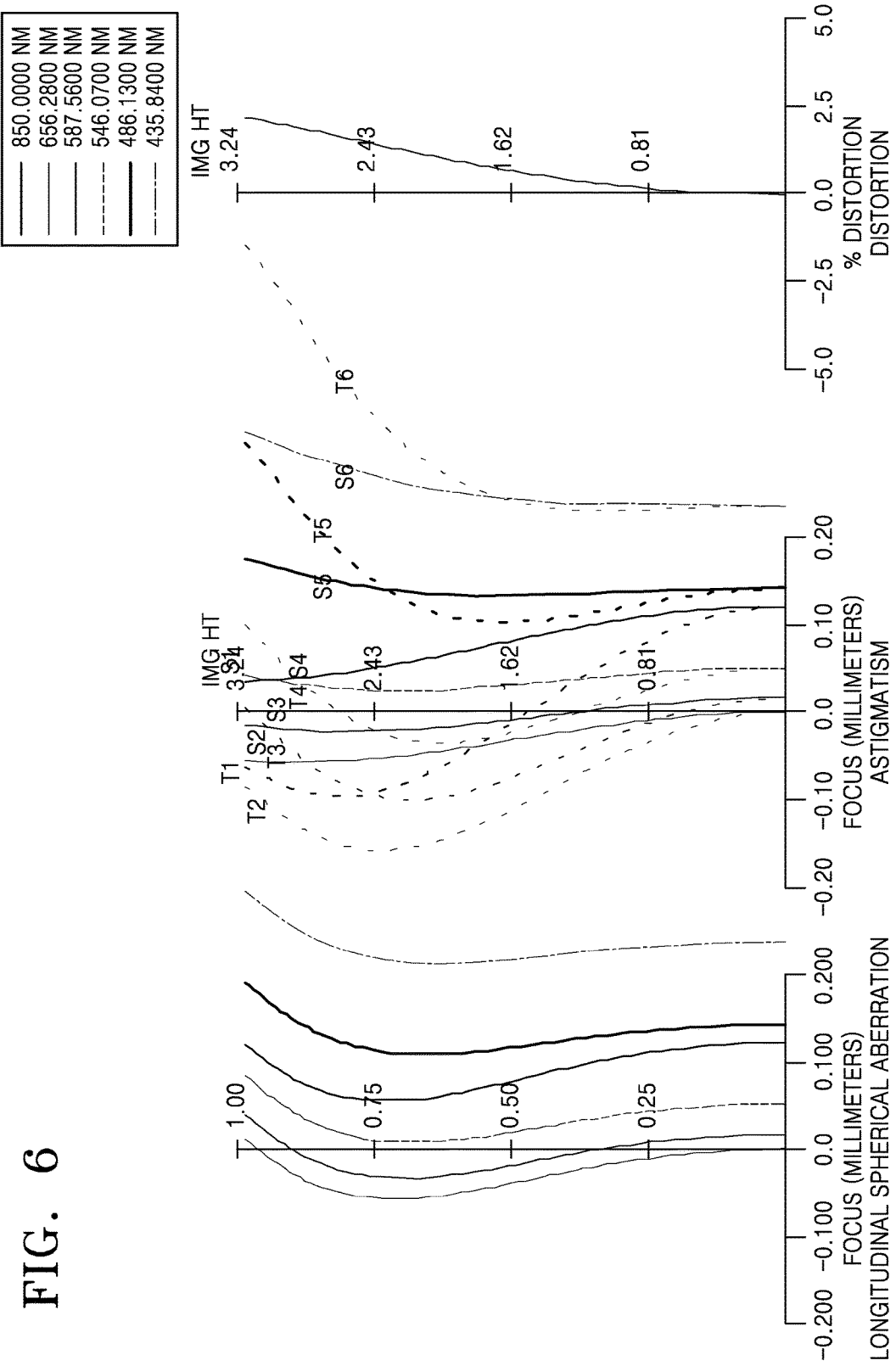
FIG. 6 illustrates graphs providing information about a longitudinal spherical aberration, astigmatism, and distortion of the zoom lens system at the telephoto position illustrated in FIG. 2 according to an exemplary embodiment.

FIG. 3 illustrates graphs providing information about a longitudinal spherical aberration, astigmatism, and distortion of the zoom lens system at the wide-angle position (f=4.53) illustrated in FIG. 1 according to an exemplary embodiment. FIG. 4 illustrates graphs providing information about a longitudinal spherical aberration, astigmatism, and distortion of the zoom lens system at a first middle position (f=10.01) between the wide-angle position and the telephoto position. FIG. 5 illustrates graphs providing information about a longitudinal spherical aberration, astigmatism, and distortion of the zoom lens system at a second middle position (f=64.82) between the wide-angle position and the telephoto position according to an exemplary embodiment. FIG. 6 illustrates graphs providing information about longitudinal spherical aberration, astigmatism, and distortion of the zoom lens system at the telephoto position (f=135.39) illustrated in FIG. 2 according to an exemplary embodiment.

In FIGS. 3 through 6, the spherical aberration and astigmatism of the zoom lens system are plotted with respect to light having wavelengths of 435.84 nm, 486.13 nm, 546.07 nm, 587.56 nm, 656.28 nm, and 850.00 nm, and the distortion of the zoom lens system is plotted with respect to light having a wavelength of 587.56 nm. In the astigmatism graphs, dashed lines refer to tangential astigmatism and solid lines refer to sagittal astigmatism.

As described above, according to the one or more of the above exemplary embodiments, the zoom lens system may effectively correct an aberration. However, the scope and spirit of the inventive concept are not limited thereto.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While exemplary embodiments have been particularly shown and described above, it will be understood by those of ordinary skill in the art that various changes in form and details may be made therein without departing from the spirit and scope of the inventive concept as defined by the following claims.

What is claimed is:

1. A zoom lens system, arranged in an order from an object side to an image side, comprising:
   a first lens group having a positive refractive power and comprising:
      a first lens;
      a second lens;
      a third lens; and
      a fourth lens, the first, second, third and fourth lenses arranged in an order from an object side to an image side with no intervening lens or lens group;
   a second lens group having a negative refractive power;
   an aperture stop;
   a third lens group having a positive refractive power;
   a fourth lens group having a positive refractive power; and
   a fifth lens group having a positive refractive power,
   wherein an Abbe number of each of the second lens, the third lens, and the fourth lens of the first lens group is greater than or equal to an Abbe number of each of the lenses included in the second, third, fourth and fifth lens groups,
   wherein the second lens group comprises:
      a fifth lens;
      a sixth lens; and
      a seventh lens,
   wherein the third lens group comprises:
      an eighth lens;
      a ninth lens; and
      a tenth lens, the eighth, ninth, and tenth lenses arranged in an order from the object side to the image side with no intervening lens or lens group; wherein the Abbe number of each of the second lens, the third lens, and the fourth lens of the first lens group is equal to one another; wherein the eighth lens is the most object side lens of the third lens group;
   wherein an Abbe number of the eighth lens is equal to the Abbe number of each of the second lens, the third lens, and the fourth lens of the first lens group.

2. The zoom lens system of claim 1, wherein the zoom lens system is configured to vary a magnification setting between a wide angle position and a telephoto position by changing a distance between the first lens group and the second lens group.

3. The zoom lens system of claim 2, wherein the zoom lens system is configured to vary the magnification setting of the zoom lens system from a wide angle position to a telephoto position by increasing a distance between the first lens group and the second lens group.

4. The zoom lens system of claim 1, wherein positions of the first lens group and the fifth lens group are fixed along an optical axis.

5. The zoom lens system of claim 1, wherein in response to a magnification setting of the zoom lens system being varied from a wide angle position to a telephoto position, a distance between the aperture stop and the third lens group is configured to be decreased and fixed at a preset value after being decreased.

6. The zoom lens system of claim 1, wherein at least one of the second lens group, the third lens group, and the fourth lens group comprises a lens having an aspheric surface.

7. The zoom lens system of claim 1, wherein each of the second lens group, the third lens group, and the fourth lens group comprises a lens having an aspheric surface.

8. An image capturing system comprising:
   an imaging device configured to capture an image; and
   the zoom lens system of claim 1.

9. The zoom lens system of claim 1, wherein the Abbe number of each of the second lens, the third lens, and the fourth lens of the first lens group is greater than two times an Abbe number of the first lens of the first lens group.

* * * * *